United States Patent [19]

Bernard

[11] Patent Number: 4,529,152

[45] Date of Patent: Jul. 16, 1985

[54] DEVICES FOR MANEUVERING HELICOPTERS ON A SHIP'S DECK

[75] Inventor: Louis A. Bernard, Saint-Victoret, France

[73] Assignee: Societe Nationale Industrielle Aerospatiale, Paris, France

[21] Appl. No.: 531,283

[22] Filed: Sep. 12, 1983

[30] Foreign Application Priority Data

Sep. 13, 1982 [FR] France ................ 82 15414

[51] Int. Cl.$^3$ .............................................. B64G 1/22
[52] U.S. Cl. .................... 244/116; 114/261; 104/244.1; 180/79
[58] Field of Search ............ 244/63, 114 R, 115, 244/116; 104/139, 140, 244.1; 180/79, 131; 280/776; 114/261

[56] References Cited

U.S. PATENT DOCUMENTS

| | | | |
|---|---|---|---|
| 1,749,357 | 3/1930 | Schmelz | 244/63 |
| 2,068,403 | 1/1937 | Ekstrom | 104/244.1 |
| 2,386,814 | 10/1945 | Rosendahl et al. | 244/116 |
| 3,162,404 | 12/1964 | Squire | 244/114 R |
| 3,410,223 | 11/1968 | Miller | 104/139 |
| 3,459,134 | 8/1969 | Shepherd | 244/63 |
| 3,640,490 | 2/1972 | Baekken | 244/116 |
| 3,830,452 | 8/1974 | Seay | 244/116 |
| 4,319,722 | 3/1982 | Pesando | 244/116 |
| 4,397,254 | 8/1983 | Deady | 244/116 |

FOREIGN PATENT DOCUMENTS

| | | | |
|---|---|---|---|
| 0047638 | 3/1982 | European Pat. Off. | 244/116 |
| 1463788 | 11/1966 | France . | |
| 2234190 | 1/1975 | France . | |
| 2462341 | 2/1981 | France . | |
| 8301428 | 4/1983 | PCT Int'l Appl. | 244/115 |

*Primary Examiner*—Galen L. Barefoot
*Attorney, Agent, or Firm*—Stevens, Davis, Miller & Mosher

[57] ABSTRACT

The invention relates to devices for maneuvering helicopters on the deck of a ship. According to the invention, the helicopter, whose landing gear comprises at least one swivelling wheel, is maneuvered between a take-off and landing area and a garage area on the deck of a ship with the aid of a guide carriage, moving in a guide rail and connected to a fitting on the helicopter by a telescopic rod or a cable, as well as a guide bar engaged by a roller in the rail and hooked by a fork joint on the axle of the swivelling wheels of the helicopter. When the helicopter is displaced towards the garage area by traction on a towing cable hooked at the front of the helicopter on the rear of which is hooked a retaining cable maintained tensioned, the helicopter automatically and progressively aligns itself on the axis of the rail due to the guide bar. The invention is more particularly applicable to flight decks of ships, platforms, etc.

8 Claims, 18 Drawing Figures

DEVICES FOR MANEUVERING HELICOPTERS ON A SHIP'S DECK

The present invention relates to manoeuvring devices ensuring the displacement of loads or machines supported by wheels on a flat platform, between at least two predetermined zones on the platform, and the invention relates more particularly to devices for manoeuvring a helicopter between a landing and take-off area and a garage area contiguous thereto and preferably protected by a hangar, for example on the deck of a ship, so that the displacement of the helicopter from one of these areas to the other is carried out in complete safety, without rupture of the link between the helicopter and the deck of the ship even when the ship is navigating in bad weather.

At the present time, numerous ships, particularly warships, industrial fishing boats and oil prospecting ships, as well as numerous barges and platforms for drilling or developing offshore oil fields, are equipped with a flight deck and an adjacent garage zone, on which a hangar is possible mounted, and adapted for at least one helicopter attached to the unit in question. On ships of relatively low tonnage, such as corvettes or destroyers, the landing and take-off area as well as the adjacent garage area, which are of very limited surfaces, are defined on a deck at the rear of the ship.

In order to facilitate landing, which is the most delicate and most difficult operation, particularly under poor atmospheric conditions, landing aid devices have been developed, in order to reduce the risks of accident.

One of these devices, which is currently used, comprises a hatch opening substantially in the deck of the ship and in which two lateral jaws are actuated by manoeuvring members, generally hydraulic or pneumatic, closing on a probe fast with the helicopter and suspended vertically therebeneath, when said probe has penetrated in the hatch, after the lowering of the helicopter towards the deck provoked by the traction on a landing cable wound on a landing winch and whose end was previously hooked to the lower end of the probe.

This device is used in the following manner: to land, the helicopter hovers with respect to the ship, above the deck. In this configuration, as the horizontal speed of the helicopter with respect to the sea is always low, safety regulations impose that the helicopter moves windward, and therefore the ship too, which must consequently take an "aviation heading", and must most often change course for a time sufficient for the landing. From the hovering helicopter, a messenger cable is lowered onto the deck of the ship, and an end hook on the landing cable is hooked to the messenger cable, which is then raised into the helicopter so that the hook is hooked to the lower end of the probe. This probe is then suspended beneath the fuselage of the helicopter whilst being rigidly fixed thereto and the landing cable, which passes through a central orifice at the bottom of the hatch, most often defined by a circular opening, is then wound on the landing winch disposed beneath the deck, with the result that, by a substantially vertical traction, the helicopter is drawn towards the deck. When the probe has penetrated in the opening of the hatch, the jaws close and clamp the probe therebetween, maintaining the helicopter applied against the deck, whatever the movements of the latter due to the roll and pitch of the ship, and whatever the force of the wind.

It is observed that the sequence of these different landing operations is relatively long and that the ship is therefore forced to change course and make a deviation for an appreciable length of time. This might not be possible if the ship is near the coast, rocks, etc., or may be dangerous if it is a warship thus forced to leave its position within a fleet in combat formation, and to move away from this fleet, consequently exposed to submarine and air attacks, and at the same time weakening the defence system of the fleet. For these reasons, and due to the dimensions and complexity of the structure of such a device on and beneath the deck of a ship, due to its cost and the cost of the considerable modifications which must be made to the ship's superstructure, another landing aid device is being used more and more often.

This second device is a device for quickly securing the helicopter to the deck by a mooring gear or harpoon. A mooring gear, transported by the helicopter, is projected substantially vertically into a grid solidly fixed on the deck of the ship, when the helicopter touches the deck. The mooring device, which is controlled hydraulically, engages and hooks in this grid, then exerts by traction on the grid a force retaining the helicopter on the deck of the ship. This embodiment is advantageous insofar as the specific fittings on the helicopter are no more complex than those of the device comprising a probe, a landing cable and nippers, whilst the specific fittings on the ship are considerably simplified, since it suffices to fix a grid, for example a circular one, in the plane of the deck and in an opening in the central zone of the landing area, which does not present any particular difficulty. Moreover, when the helicopter is equipped with a landing gear with pivoting wheels, in particular of the tricycle type with auxiliary front landing gear, the helicopter may rotate about the mooring gear hooked in the grid, under the effect of the thrust exerted by the rotation of the rotors of the helicopter in order to be aligned in a desired direction, either windward for take-off, or to be displaced on the deck towards a garage area.

In fact, after the helicopter has landed on the deck and after it has been secured by one or the other of the two devices mentioned above, the helicopter must be displaced towards a garage area, preferably into a hangar, in order to proceed with the necessary maintenance and repair operations and/or to clear the landing and take-off area to allow at least one other helicopter to land or take off.

This displacement may also constitute an extremely dangerous operation when atmospheric conditions are poor and when the deck is inclining too much due to the roll of the ship, because the control of the helicopter may be lost during this displacement, and during the indispensable prior operations for lining up the helicopter with a view to this displacement, as the position occupied by the helicopter secured to the deck, after it has landed, may vary considerably from one landing to another.

For these reasons, numerous devices for manoeuvring a helicopter on the ship's deck have already been imagined.

French Pat. No. 2 036 986 describes a device comprising two rails fixed beneath the deck and which ensure the longitudinal guiding (i.e. in the direction of passage from the landing area to the garage area) of two motorized carriages driving toothed pinions which mesh in racks borne by the two rails. Each of the carriages is connected to one end of a crosspiece disposed on the deck, which thus ensures longitudinal displacement. Another carriage is guided along the crosspiece and motorized thereon in order to ensure transverse displacement, whilst a rocking lever, mounted to pivot about a vertical axis at the end of a substantially horizontal arm of the carriage borne by the crosspiece, is hooked on the main landing gears of a helicopter and allows angular orientation of said helicopter. The helicopter is pushed or drawn by this device, depending on whether it is equipped with a landing gear incorporating auxiliary front landing gear or with a tail wheel, and its path on the deck is obtained by combination of the longitudinal displacement of the crosspiece, the transverse displacement of the carriage, and the rotation of the rocking lever. This device, which is complex and cumbersome, can be used only after considerable work has been done on the ship, and it must comprise a specific carriage-rocking lever assembly for each type of helicopter. Moreover, the main landing gears must be equipped with axles for picking up the personalized carriage-rocking lever assembly, and, in the case of a helicopter equipped with an auxiliary front landing gear, the latter must present a considerable offset of wheel. Finally, this device is not directly compatible with the two landing aid devices described hereinabove, since, to hook the rocking lever on the main landing gears without being hindered by the probe or the mooring gear which project beneath the fuselage of the helicopter in the zone precisely disposed substantially between the main landing gears, it is necessary to retract the probe or the mooring device into the helicopter, which is consequently momentarily no longer positively or materially retained on the deck. This is inacceptable.

Certificate of Addition No. 2 157 678 to the French Patent mentioned above describes a similar device in which two guide rails on the deck of the ship guide end bogies of a crosspiece displaced longitudinally by a mechanism of longitudinal sidebands driven in the rails by motorized drums, and the transverse displacement carriage is mounted to slide freely on the crosspiece whilst, as before, the angular orientation of the helicopter is ensured by the rocking lever fixed to the main landing gears and pivoting on the carriage about a vertical axis.

In order to prevent any sudden displacement of the helicopter, either in angular orientation or in transverse displacement, due to the roll of the ship, the device comprises a braking and damping mechanism.

This device presents the same drawbacks as the one described in the main Patent, but, in addition, the path of the helicopter pushed or drawn by this device depends on the orientation given to the wheel or to the wheels of the front landing gear, or to the swivelling tail wheel, for example by a deck hand who also supervises passage through the hangar door since materially there is nothing to ensure that the helicopter follows a sure path.

U.S. Pat. No. 3,830,452 describes a device comprising a guide rail fixed on the deck and along which circulates a carriage driven by a cable passing in the rail and wound on a winch. The carriage is equipped with a sleeve pivoting about a vertical axis as well as about an axis parallel to the axis of the rail, and in which is slidably mounted a box-girder with toothing cooperating with an immobilizing pawl fixed to the sleeve, in order to block the box-girder, of which the two ends are fixed by the interior to the axles of the wheels of the main landing gears, opposite the sleeve and therefore the carriage, after the helicopter has aligned itself on the rectilinear rail. The device also comprises two lateral winches winding two cables hooked on either side of the rear part of the fuselage of the helicopter, in order to allow the latter to be aligned on the rail. The helicopter is drawn via the box-girder after a succession of centering, locking and alignment operations, which is long and fastidious.

In fact, after the ends of the box-girder have been fixed to the axles of the wheels of the main landing gears, a first rough alignment is effected with the aid of the lateral winches. A limited displacement of the carriage on the rail by traction on the cable in the direction of the garage area then provokes a certain slide of the box-girder in the sleeve. Due to the pawl, the box-girder is then immobilized in the sleeve and the helicopter is definitively aligned on the direction of the rail, with the aid of the lateral winches. It is only after then having detached from the helicopter the cables of the lateral winches that the helicopter is effectively displaced towards the garage area, displacing the carriage with the aid of the cable and the winch installed to this end.

This device, which can be used only for manoeuvring helicopters comprising a tail wheel or an auxiliary rear landing gear, is not at all compatible with the landing aid device of the grid-mooring gear type, as the arrangement of a grid in the central zone of the landing area means that part of the rail must be eliminated, with the result that the carriage can no longer be suitably placed for the box-girder that it bears to be fixed on the main landing gears. Moreover, as the pivot axis of the carriage, half way between the main landing gears, merges with the axis of the mooring gear, it is necessary to release the mooring gear from the grid and to retract it into the helicopter in order to be able to fix the box-girder, assuming that this is possible. It follows that the helicopter is momentarily no longer materially retained on the deck of the ship, which is a critical, inacceptable situation taking into account the various movements to which the deck is subjected. Finally, the carriage/box-girder assembly of this device is cumbersome and of complex structure, and the main landing gears of the helicopter must be modified to pick up the box-girder.

U.S. Pat. No. 4,397,254 describes a manoeuvring device compatible with the landing aid devices constituted by the grid/mooring gear device and the probe/landing cable/nippers device. This manoeuvring device comprises a runway on the deck and a carriage mobile on said runway. This carriage bears a vertically mobile probe whose upper end is placed in a device incorporating nippers mounted in the lower part of the fuselage of the helicopter. The probe is borne by a frame which moves transversely on the carriage with respect to the longitudinal direction of the runway and which may be locked in suitable position beneath the nippers of the helicopter, in order to cooperate therewith to maintain the helicopter applied against the deck.

This device is therefore similar to the landing aid device incorporating probe and nippers are borne by the helicopter and the probe is fixed on the carriage moving on the deck.

However, the carriage is equipped, in addition, with a second frame, adapted to move longitudinally with respect to the carriage, and which bears a grid compatible with a mooring gear of a landing aid device of the grid/mooring gear type, with the result that, after landing and cooperation of the mooring gear of the helicopter with a grid in the deck, then the cooperation of the probe of the carriage with the nippers of the helicopter, the mooring gear may be detached from the grid in the deck then engaged in the grid of the second frame of the carriage, after this second frame has been positioned beneath the retracted mooring gear. The helicopter thus rigidly connected to the deck by two links (the probe and the mooring gear) may then be displaced by traction on the carriage.

This device therefore presents the drawbacks of being very complex and of necessitating important, expensive fittings both on the ship and on the helicopter. Moreover, despite the possibility of transverse displacement of the frame which bears the probe with respect to the carriage, it is indispensable to proceed with operations for orientation of the helicopter, for example by special manoeuvres of the front landing gear, to ensure a precise, definitive alignment of the helicopter before its actual displacement, such alignment having to allow the cooperation of the mooring gear with the grid of the carriage and a two-point guiding necessary for the straightness of the helicopter's displacement.

U.S. Pat. No. 3,640,490 describes combined installations for aiding landing and for manoeuvring a helicopter on the deck of a ship, which group together on the one hand a landing aid device of the type incorporating probe, landing cable and nippers, and on the other hand a manoeuvring device chosen from several variants as a function of the type of landing gear with which the helicopter is equipped.

According to a first installation, adapted more particularly for helicopters equipped with a tail wheel, the nippers are borne on a carriage mounted in a rail fixed in the bridge and displaced by traction on a cable wound on a hauling winch.

This installation is complex due to the numerous fittings to be made on the ship, in order to allow a displacement of the device incorporating nippers with the carriage (electro-hydraulic equipment comprising a hydraulic system for manoeuvring the nippers, and set of cables and winches with cable tensioner and accumulator beneath the deck). Moreover, this installation is disadvantageous as the dimensions in height, particularly of the nipper-holding carriage, are large, which is detrimental during landing and prevents reception of certain helicopters and, on the other hand, because the helicopter is towed by the carriage only via the probe which is suspended beneath the fuselage, so that this retractable probe must be mounted on the fuselage by a very rigid, therefore heavy and complex fixing device.

According to a second installation, the carriage for displacing the helicopter on the deck does not bear the nippers, but they are combined with a turntable mounted in the central zone of the landing area. After having landed, the helicopter rests on the turntable and is maintained thereon by the tightening of the nippers on the probe. The table is then turned in order to align the helicopter with a section of take-over rail connected by a switching rail to one or the other of two displacement rails each leading towards one of two garage positions in the hangar. A bearing and drive carriage equipped with hoisting jacks is guided on the rails and placed beneath the helicopter, so that a mechanism for blocking the carriage is joined to the probe, which is allowed due to the cooperation of the turntable and the take-over rail. The helicopter is then also connected to the carriage at the different hoisting jacks and the latter are supplied by a hydraulic system borne by the carriage, in order to raise the helicopter with respect to the turntable, so that, by traction on a cable connected to the carriage and disposed in the axis of the rail chosen, and after release of the probe by the nippers, it is possible to displace the carriage bearing the helicopter towards the corresponding location in the hangar.

This second installation is also disadvantageous due to the complexity of the fittings to be made on the ship, particularly at the combination of the nippers and the turntable and their drive in rotation, especially if it is desired that this table be used to receive helicopters of a certain tonnage. Moreover, a mechanism comprising a cable, a winch and a double rack must be installed for angular positioning of the take-over rail. Finally, the bearing and drive carriage is both complex and cumbersome as its structure must withstand the load of the helicopter and this carriage is equipped with a mechanism for blocking the probe, a hydraulic mechanism for hoisting the helicopter and the corresponding hydraulic system, as well as a device for guiding on the rails. Furthermore, it appears difficult to envisage using such an installation for landing and for the displacements of helicopters which are not equipped with a landing gear incorporating skids.

According to a third installation, more particularly intended for helicopters of which the landing gear comprises an auxiliary front landing gear, the landing aid device is such that the nippers are installed beneath a circular opening in the deck and in which the probe must penetrate, and two rails for guiding a helicopter drive carriage are substantially tangential to this circular opening. After it has landed and after the probe has been clamped in the nippers, the helicopter is aligned substantially parallel to one of the rails by manoeuvring a tranverse winch and two cables hooked on either side of the rear part of the fuselage. A drive carriage, provided on one side with a lateral sleeve in which is slidably mounted a dog for gripping the probe and, on the other side, with a lateral arm whose end is provided with a hooking mechanism, is positioned beneath the helicopter so that the dog grips the probe and the hooking mechanism is fixed to the standard towing attachment which is located on the main landing gear on the corresponding side of the helicopter. The nippers then release the probe and the carriage is then drawn by a cable and a towing winch towards the hangar. This embodiment, although simpler than the preceding ones, presents the drawbacks that the carriage must be specific of the helicopter received if it is desired that the arm hooking mechanism be suitably connected to one of the main landing gears, and that for each rail tangential to the opening for passage of the probe in the deck and for each carriage moving along one of the rails, there is a prohibited zone in this opening, in which the probe cannot be gripped by the dog of the carriage due to the position of the corresponding sleeve projecting into the opening. In this case, the probe can be gripped only by the dog of the carriage guided by the other rail, but if the corresponding location in the hangar is already occupied by another helicopter, it becomes impossible to guide the helicopter which has just landed into the hangar.

Furthermore, it should be remembered that this installation, as well as the other two described in the last Patent mentioned above, are compatible only with a landing aid device of the type incorporating probe, landing cable and nippers, and that they therefore suffer from all the limitations associated with this solution, particularly that the ship must take an aviation heading as explained above, with all the dangers that this represents. Moreover, these three embodiments all necessitate an operation for alignment of the helicopter prior to the displacement towards the hangar, and therefore means specific to this end.

It is an object of the present invention to remedy the above drawbacks, by proposing a device of simple and inexpensive structure, which is easily positioned without imposing important modifications of the helicopter and of the ship's superstructure.

It is a further object of the invention to provide a device adapted to manoeuvre helicopters of which the landing gear comprises at least one swivelling wheel and which is directly compatible, without it being necessary to proceed with special fittings, with the landing aid devices of the grid/mooring gear type and of the probe/landing cable/nippers type.

To this end, the device according to the invention, adapted to manoeuvre a machine supported by at least one swivelling wheel, such as a helicopter, between two predetermined zones on a flat platform, such as a landing and take-off area and a garage area on the deck of a ship, and which comprises a towing mechanism, adapted to drive the machine from one zone to the other, at least one guide rail installed on the platform and extending from one zone to the other, along which at least one guiding carriage provided with a member for connection to the machine is adapted to move, is characterized in that it further comprises at least one guide bar adapted to be connected by one end to the swivelling wheel and to be engaged and guided by the other end in a guide rail, so that the machine is automatically and progressively recentred and aligned on the rail at the beginning of the displacement from one zone towards the other, due to the combined effects of the carriage and of the guide bar.

According to the invention, when the carriage guide rail is curved, particularly in its part which extends over the garage area, in order to benefit most from the surface available at this spot, the guide bar is engaged in a guide rail different from the carriage guide rail, so that the curves of the carriage guide rail are negotiated without the tyres of the main landing gears skidding, whilst the helicopter remains plumb above the carriage.

On the other hand, if the carriage guide rail is rectilinear, which facilities displacements in the two directions from one zone to the other, this rail may simultaneously be used as rail for guiding the guide bar.

This solution is very advantageous not only when the ship is equipped for the first time with a manoeuvring device, as it suffices to install one rail on the deck per garage location in the hangar, but also when the ship is already equipped with a manoeuvring device of the type described in U.S. Pat. No. 3,640,490, which may be considerably simplified by the elimination of all the prior alignment means (turntable or transverse winches) and of which the operation is largely improved by modifications according to the invention. In fact, in this case, the guide rail, the carriage and the towing mechanism of the pre-existing device are the only elements maintained, and it suffices to add thereto at least one guide bar to obtain a device according to the invention, such that the combination constituted by the helicopter, the carriage, the guide bar and the rail effects self-centering during the displacements, without necessitating elements for prior centering and alignment and for locking in centred position.

According to the invention, the end of the guide bar which is not engaged in the rail may be connected either to the tail wheel or to the wheel or wheels of an auxiliary front landing gear of the helicopter, depending on the type of landing gear with which the helicopter is equipped, and the end of the guide bar engaged in the rail is disposed either between the point of connection of the other end of the guide bar and the point of fixation on the helicopter of the member for connection to the carriage, or to the outside of the segment connecting these two points, in the direction of the displacement, depending on whether the helicopter is displaced in one or the other direction from one of the zones to the other.

The device preferably comprises two guide bars of unequal length, the one of smallest length being used with its end engaged in the rail disposed between the point of fixation on the helicopter of the member for connection to the carriage and the point of connection of the other end of the guide bar.

In a preferred embodiment associated with the landing aid device incorporating grid and mooring gear, which is easy to install on a ship, which does not require the presence of personnel on the deck, allows the pilot of the helicopter complete freedom and permits landing in all directions, without the ship taking the "aviation heading", as well as the pivoting of the helicopter with rotors rotating, by the orientation or offset of the front wheel, if the landing gear comprises an auxiliary front landing gear, the member for connection of the carriage to the helicopter is a telescopic connecting rod, mounted to pivot on the carriage by one end and of which the other end is adapted to be mounted to pivot on a fitting fast with the structure of the helicopter beneath the fuselage thereof, in the median longitudinal plane of the helicopter, and this telescopic connecting rod permanently exerts a traction on the helicopter, during manoeuvring thereof, in order to increase its stability on the ship's deck. This telescopic rod may be replaced by a simple cable tensioned by a jack located on the carriage.

In this case, the towing mechanism advantageously comprises two winches, disposed in the axis of the carriage guide rail, on either side of the path of the helicopter, and two cables each wound on one of the two winches, and such that one of the cables is adapted to be hooked to a point of fixation on the front of the helicopter, in order to displace the latter from one zone to the other when the corresponding winch operates as towing winch, whilst the other cable is adapted to be hooked to a point of fixation on the rear of the helicopter, in order to displace the latter in opposite direction when the corresponding winch operates as towing winch.

During these displacements, the two cables are preferably hooked to the helicopter and one of the winches operates as a towing winch whilst the other operates as retaining winch, the two cables being constantly maintained tensioned.

In order to clear at least partially the zone of the grid of the landing aid device which separates the carriage guide rail from the point of hooking of the mooring gear in the grid, the device according to the invention further comprises a small connecting rail which makes it possible to bring the carriage sufficiently near to the structural fitting of the helicopter for the telescopic connecting rod to be connected to this fitting.

The invention will be more readily understood on reading the following description with reference to the accompanying drawings, in which.

Figure 1:
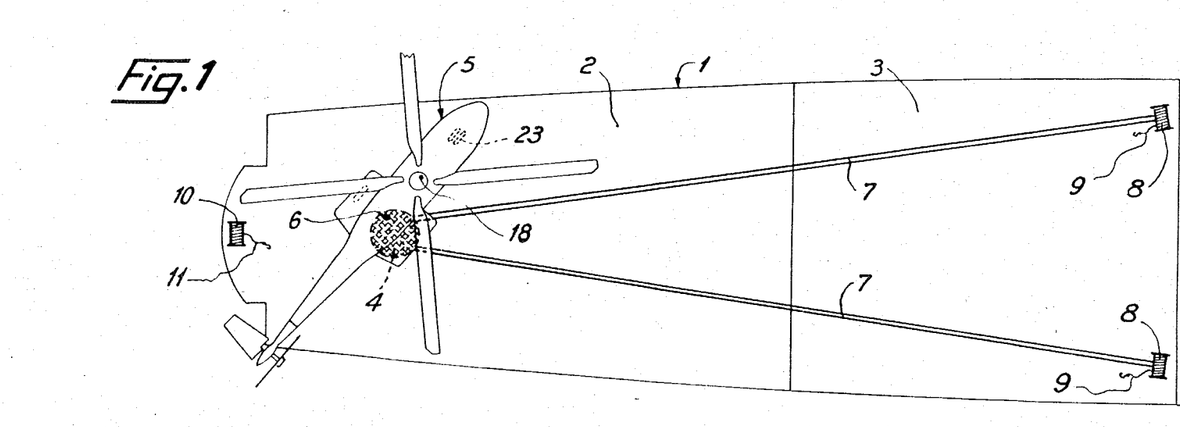
FIG. 1 shows in plan an overall view of the rear deck of a ship equipped with a landing aid device of the grid/mooring gear type and with a device according to the invention, as well as a helicopter with tricycle landing gear incorporating a front auxiliary landing gear.
Figure 2:
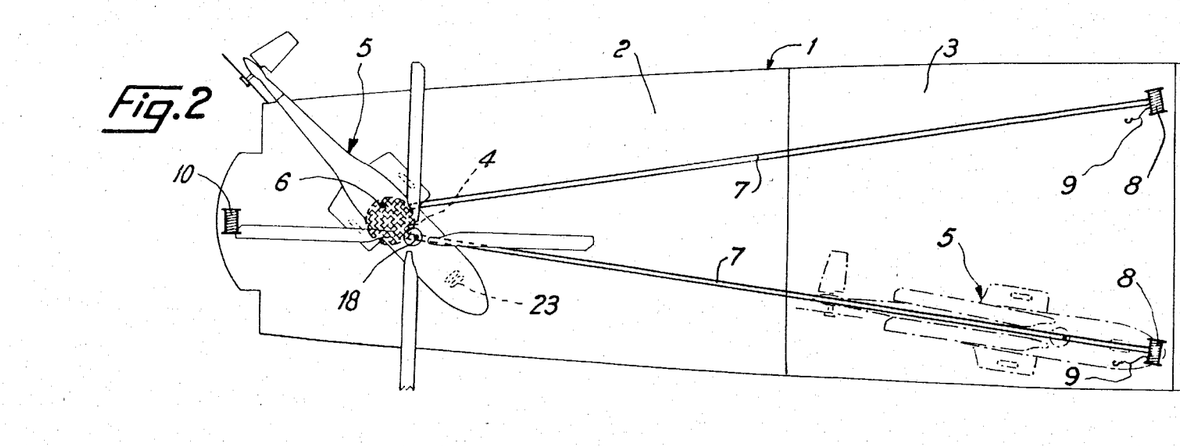
FIG. 2 shows a view similar to FIG. 1, after the helicopter has pivoted.

Referring now to the drawings, in FIGS. 1 and 2, the after deck 1 of a ship is divided into a landing and take-off area 2, located at the rear of the ship, and a garage area 3 adjacent thereto and protected by a hangar, in which two helicopters equipped with a tricycle landing gear with auxiliary front landing gear may be secured. In the plane of the landing area 2 there is installed a grid 4, centred on the longitudinal axis of the ship, of a landing aid device which also comprises, on each helicopter 5, a mooring gear or harpoon indicated at 6, borne by the helicopter 5 in the longitudinal and median plane of the latter, between the two main landing gears.

The device for manoeuvring the helicopter 5 between the landing area 2 and the garage area 3 comprises two rectilinear guide rails 7 which extend from the grid 4 substantially to the back of the garage, in divergent manner, and a winch 8, on which is wound a front cable 9 whose free end is equipped with a hook, and disposed at the end of each rail 7 in the hangar, whilst another winch 10, on which is wound a rear cable 11, whose free end is also equipped with a hook, is disposed to the rear of the ship, substantially at the point of merger of the axes of the two rails 7.

Figure 8:
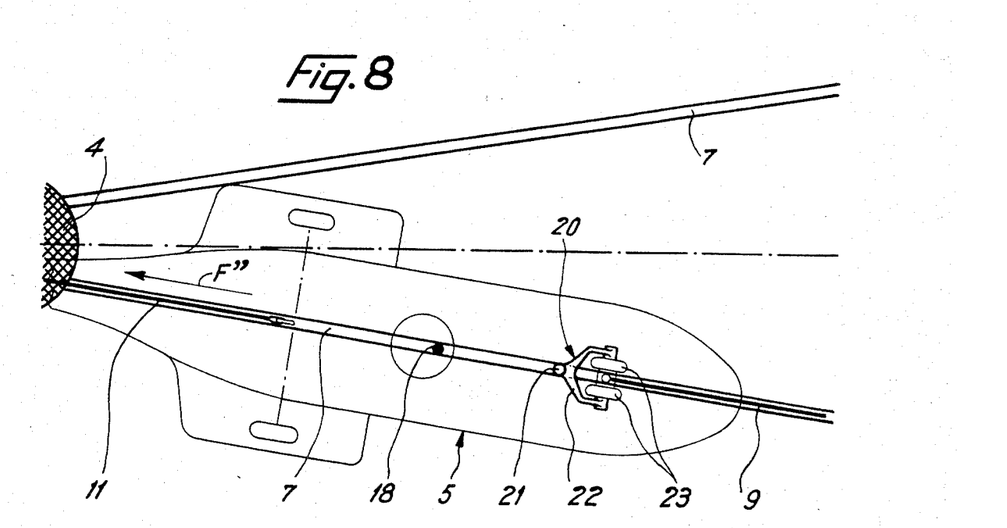
FIG. 8 is a view similar to FIG. 3, showing the helicopter in the course of displacement towards the take-off area.
Figure 9:
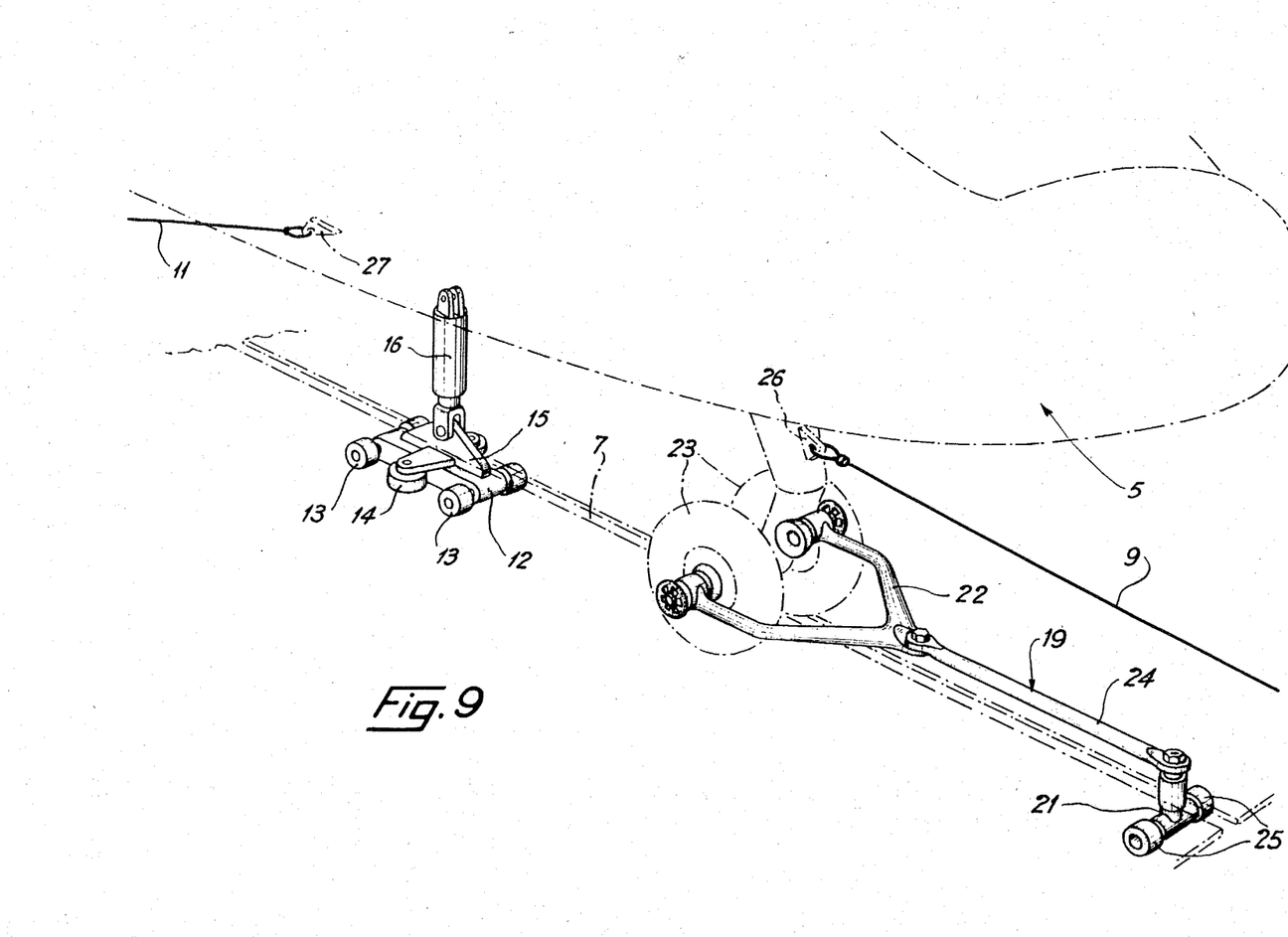
FIGS. 9 and 10 are schematic views, respectively in perspective and in section along the axis of a rail of a device according to FIGS. 1 to 8, of which the rail is fixed in the deck.
Figure 9A:
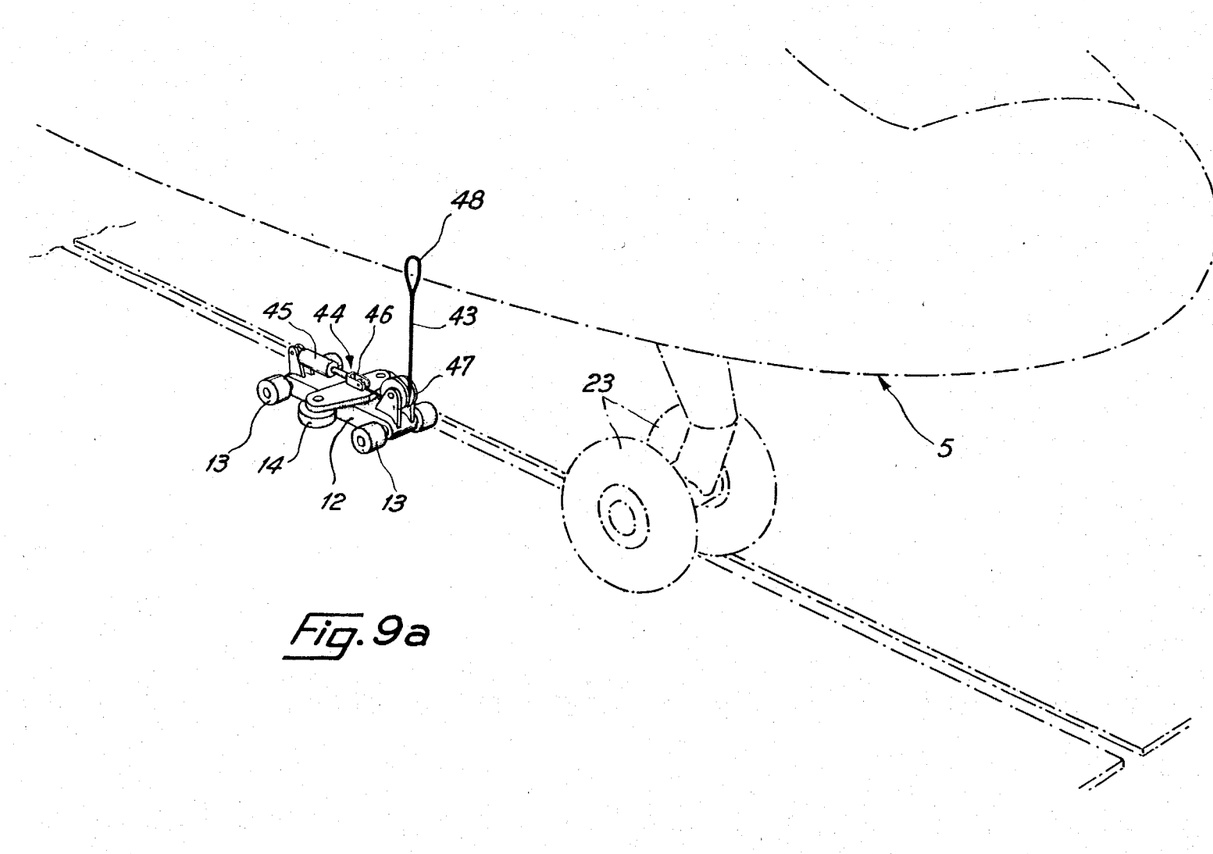
FIG. 9a is a view in perspective of the carriage equipped with a variant connecting cable.
Figure 10:
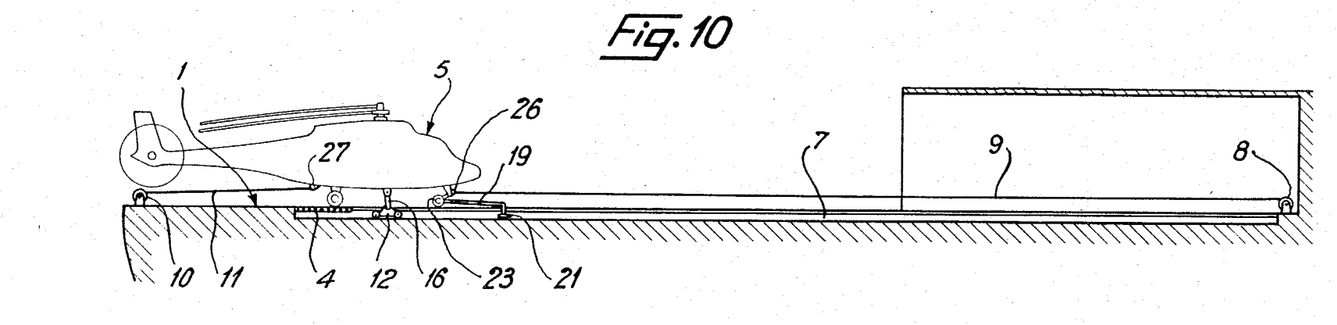
Figure 11:
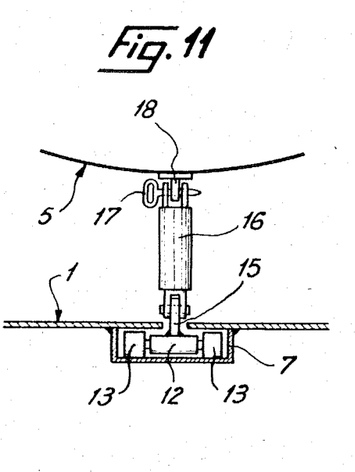
FIG. 11 is a partial sectional view showing, in front view, the fixed rail, the carriage and the connecting rod of the device according to FIGS. 9 and 10.

As shown in FIGS. 9 to 11, the rails 7 are fixed in the deck 1 and are each in the form of an elongated parallelepipedic box, which opens in the deck 1 via a groove in the median part of its upper face, and a carriage 12 is received in each rail 7. Each carriage 12 comprises vertical bearing rollers 13 disposed at the four corners, and two lateral, horizontal rollers 14, ensuring guiding against the lateral walls of the rails 7, as well as an upper vertical attachment 15 passing in the opening in the deck 1 and on which one end of a telescopic rod 16 is mounted to pivot about a transverse axis with respect to the direction of the rail 7, and with a certain transverse angular clearance, the other end of said rod being adapted to be mounted to pivot with the aid of a pin 17 on a structural fitting 18 fixed beneath the fuselage of the helicopter 5, substantially plumb with the axis of rotation of the main rotor thereof. As shown in FIG. 9a, the carriage 12 may be connected to the helicopter 5 by means of a cable 43 tensioned by a jack 44 of which the body 45 is fixed longitudinally on the carriage 12. The cable 43 is fixed to the end of the rod 46 of the jack 44 and passes over a pulley 47 of horizontal axis, disposed at the end of the carriage 12. The end of the cable is provided with a heart-shaped thimble 48 to allow its connection with a hook rigidly fast with the lower structure of the helicopter 5. On the ship, the manoeuvring device also comprises two guide bars of unequal length, of which the longer, 19, is shown schematically in FIGS. 5, 7 and 10, and the shorter, 20, in FIG. 8, and of which each comprises at one end a roller 21 for engagement in one of the rails 7 and at the other end, a fork joint 22 fixed to the two ends of the axle of the two twin wheels 23 (i.e. mounted side by side on a common axle) of the auxiliary front landing gear of the helicopter 5.

As shown in FIG. 9, the longer guide bar 19 may be constituted by a fork joint 22 removably mounted at one end of a bar 24 so as to be rigidly connected thereto, for example by connecting elements of square section, preventing any relative rotation, and the other end of the bar 24 is removably and pivotally mounted on the engaging roller 21 which is provided with two rollers 25 rolling in the rail 7, mounted at the ends of the horizontal bar of a T-shaped element, of which the vertical bar passes in the opening in the deck 1, in order to be fixed to the bar 24, whilst the shorter guide bar 20 is simply constituted by the assembly of the fork joint 22 directly on the engaging roller 21.

However, the guide bars 19 and 20 may be made in other different ways so that the engaging roller 21 can be easily introduced into the rails 7.

The device is completed on the helicopter 5 by a front fixing attachment 26, on the auxiliary front landing gear, which is none other than the towing attachment which is always provided on this landing gear to allow possible de-bogging of the helicopter, and which, within the device according to the invention, is adapted to hook one of the front cables 9, and the device is finally completed by a rear fixing attachment 27, beneath the rear part of the fuselage, and adapted for hooking the rear cable 11.

The front fixing attachment 26, the structural fitting 18 for fixing the telescopic rod 16, the mooring gear 6 and the rear fixing attachment 27 are disposed in that order from the front to the rear of the helicopter, and in the median longitudinal plane thereof.

In order to be able to fix the guide bars, two other attachments are provided at the ends of the axle of the wheels 23 of the auxiliary front landing gear.

Figure 3:
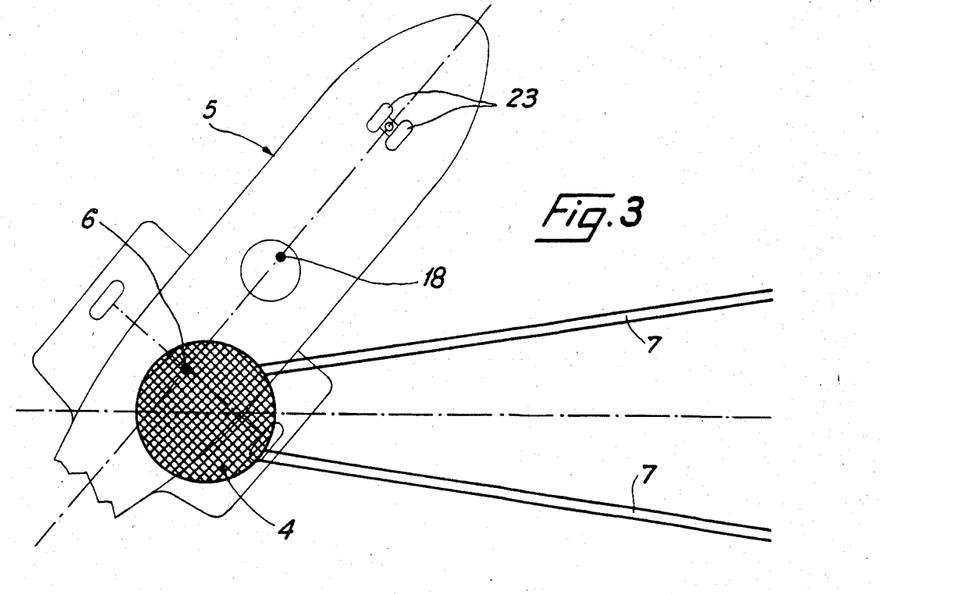
FIG. 3 is a partial plan view of the helicopter upon landing.
Figure 4:
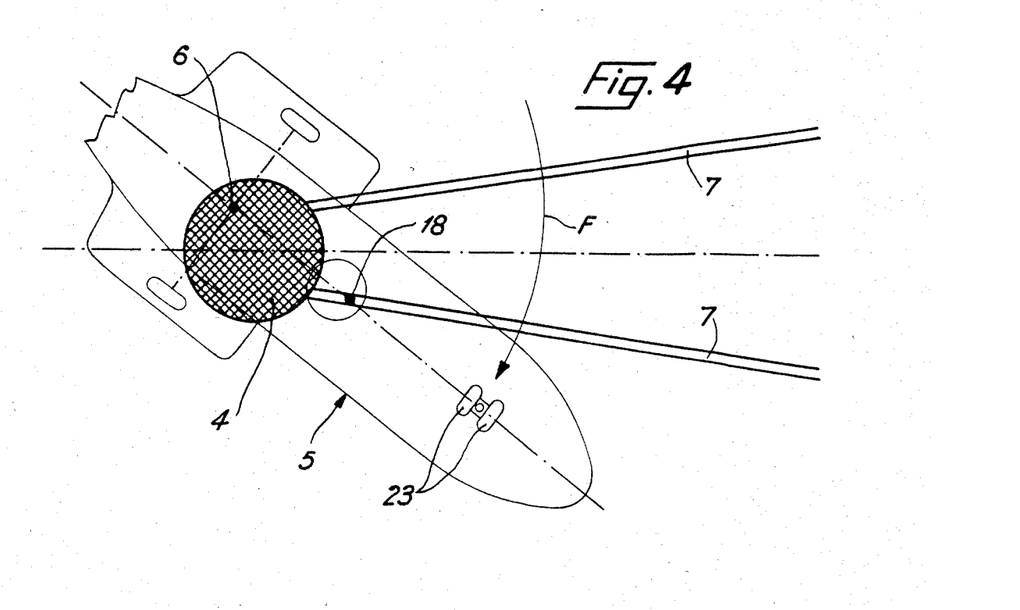
FIG. 4 is a view similar to FIG. 3 after the helicopter has pivoted.
Figure 5:
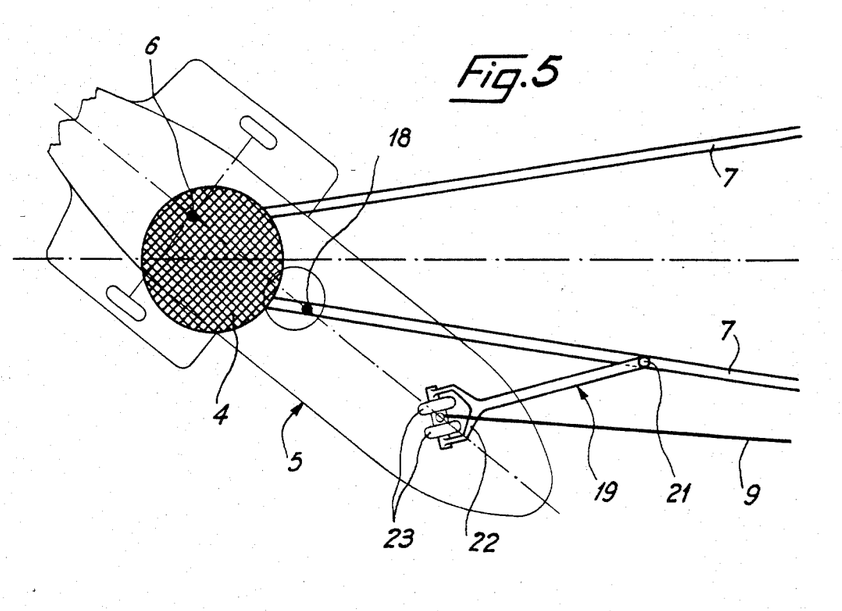
FIG. 5 is a view similar to FIG. 3, after the guide bar has been positioned.
Figure 6:
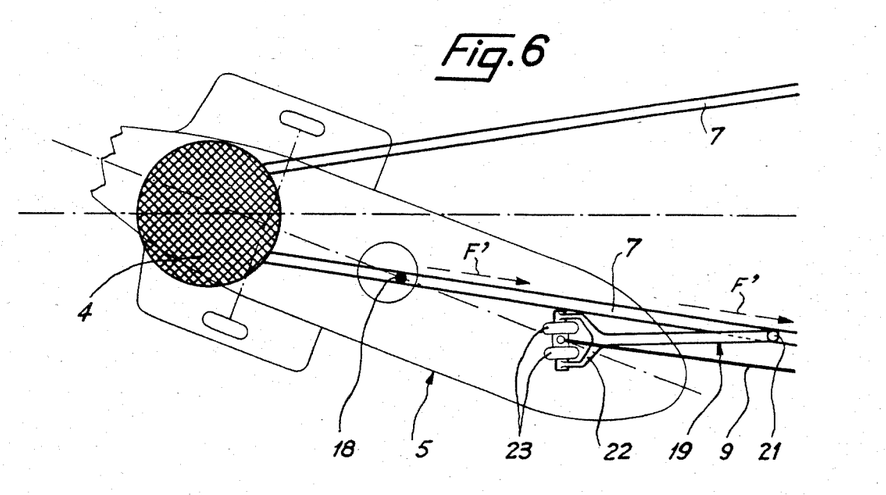
FIG. 6 is a view similar to FIG. 3 at the beginning of displacement of the helicopter towards the hangar.
Figure 7:
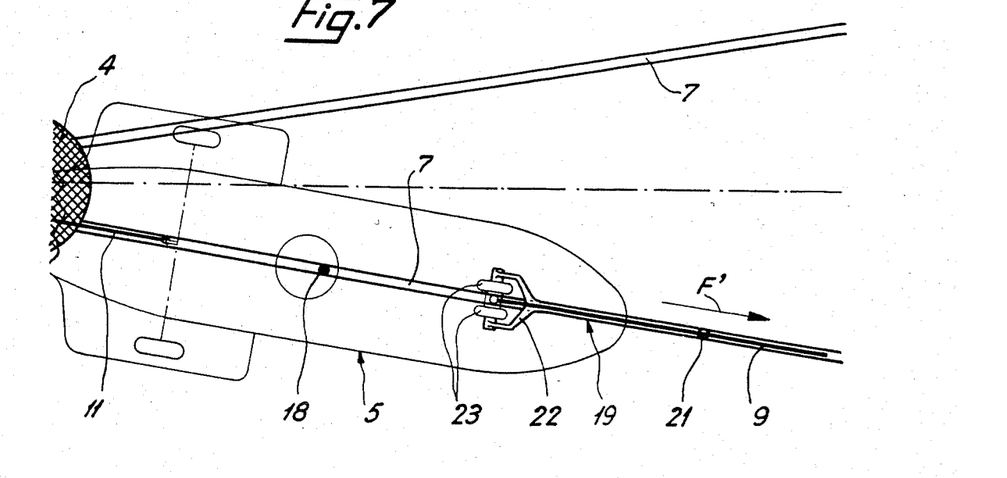
FIG. 7 is a view similar to FIG. 3 showing the helicopter in the course of displacement towards the hangar.

This device is used as follows: just after landing, the helicopter 5 is for example in the position shown in FIGS. 1 and 3. The mooring gear 6 is hooked in the grid 4 solidly fixed to the deck 1 and the landed helicopter 5 is held on the deck 1. The rotors of the helicopter still rotating, the helicopter then pivots about the mooring gear 6 by the orientation of wheels 23 of the front landing gear, due to the implantation of the mooring gear 6 in the median longitudinal plane, between the main landing gears, and the helicopter pilot causes the apparatus to pivot as indicated by arrow F until the attachment fitting 18 beneath the fuselage is substantially vertical with respect to that rail 7 which leads to the location in the garage intended for this helicopter 5, as shown in FIGS. 2 and 4. The carriage 12 is displaced by rolling it in the corresponding rail 7 from the hangar, and it is positioned beneath the helicopter 5, then the telescopic rod 16 is hooked to the fitting 18 with the aid of pin 17, and the rod 16 is tensioned, with the result that it exerts a traction on the helicopter 5 in order to increase the stability thereof on the deck 1 of the ship, and to lock the helicopter 5 on the carriage 12. After the rotors have stopped, the blades of the helicopter can then be folded, for example all rearwardly, as shown in FIG. 10, and the longer guide bar 19 is mounted by the fork joint 22 on the axle of wheels 23 of the front landing gear and engaged in the corresponding rail 7 by roller 21, at a point located in front of the front landing gear, in the direction of the hangar, after a corresponding orientation of the front wheels 23. The corresponding front cable 9 is then hooked on the attachment 26 of the front landing gear, and the rear cable 11 on the rear attachment 27, and these cables are tensioned by winches 8 and 10, as shown in FIG. 5. As the helicopter 5 is then retained on the deck 1 not only by the tensioned connecting rod 16 but also by the cables 9 and 11, it is then possible to detach the mooring gear 6 from the grid 4. After detachment of this mooring gear 6, a traction is exerted on cable 9 by winch 8 operating as towing winch, whilst winch 10 operates as retaining winch, with the result that the rear cable 11 always remains tensioned and unwinds progressively as the front cable 9 winds on winch 8. The helicopter 5 is thus displaced towards the hangar, in a movement determined by the displacement of the carriage 12 attached to the fitting 18 and of the roller 21 of the guide bar 19 in the rail 7, in the direction indicated by arrows F' in FIG. 6. From the beginning of the displacement of the helicopter 5, due to the presence and position of the guide bar 19 with respect to the carriage 12, the helicopter 5 automatically and progressively recentres and aligns on the axis of the rail 7, as shown in FIG. 6, and very rapidly, the helicopter 5 takes the position aligned on the rail 7, as shown in FIG. 7, up to its position on its garage location in the hangar, as shown in dot-and-dash lines in FIG. 3. In the hangar, the telescopic rod 16 is maintained in place on the helicopter 5, and the latter is in addition secured by means of chains. The front cable 9 and rear cable 11 are then unhooked.

To bring the helicopter 5 from the hangar to the take-off area 2, the rod 16 still being tensioned between the helicopter 5 and the carriage 12, the small guide bar 20 is fixed on the axle of wheels 23 by its fork joint 22 and its roller 21 is introduced and engaged in the rail 7, at a point located between the wheels 23 and the connection of the carriage 12 to the fitting 18 by the telescopic rod 16, then the front cable 9 is hooked on the front attachment 26 and the rear cable 11 on the rear attachment 27, and the cables 9 and 11 are tensioned. The chains for securing the helicopter are removed and winch 10 is operated as towing winch and winch 8 as retaining winch, so as to displace the helicopter 5 in the direction indicated by arrow F'', as shown in FIG. 8, in the direction of grid 4. When the helicopter is such that the mooring gear 6 is above the grid 4, the mooring gear 6 is engaged therein, then the two cables 9 and 11 are unhooked, the guide bar 20 is removed and the telescopic rod 16 is released. The rotors of the helicopter 5 may then be rotated, the helicopter then faces the wind by rotating about the mooring gear 6 and then takes off, unhooking the latter.

Figure 12:
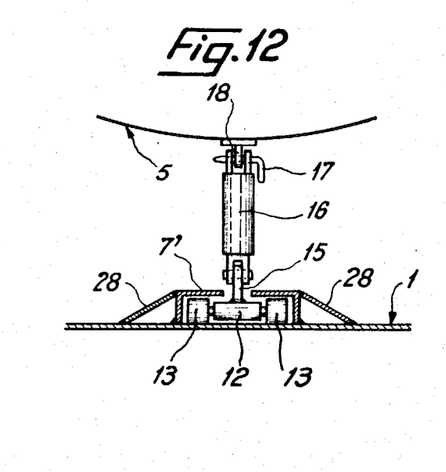
FIG. 12 is a view similar to FIG. 11 of a device of which the rail projects with respect to the deck.
Figure 13:
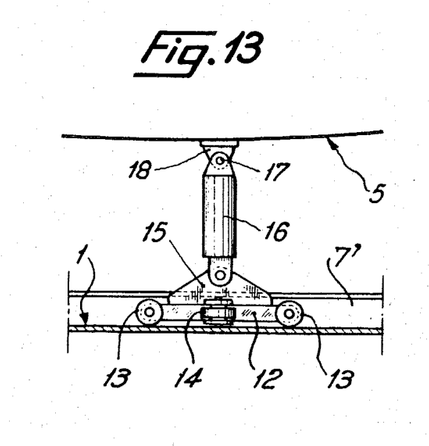
FIG. 13 is a side view of the device shown in FIG. 12.

After landing, to allow the carriage 12 to move sufficiently close to the fitting 18, so that the telescopic rod 16 can be fixed to the helicopter 5, whenever the mooring gear 6 is engaged in the part of the grid 4 located towards the rear of the ship, it may be necessary to position a section of connecting rail (not shown) in line with the chosen rail. This may be very easily carried out when the rail projects from the deck 1, as is shown in FIGS. 12 and 13. In this case, the rail 7' is laterally connected to the deck by inclined sections 28 and, for a precise type of helicopter, allocated to the ship, the width of the rail 7' may be adapted to that of the two twin wheels 23 of the auxiliary front landing gear, in order to obtain additional guiding. Similarly, the width of the inclined sections is chosen for the total width of the rail 7' and of the two inclined sections 28 to be compatible with the centre-to-centre distance of the wheels of the main landing gears, in order to obtain an improved guiding of the main landing gear.

Moreover, it will be noted that the rectilinear rails 7 and 7' make it possible, without difficulty, to carry out the manoeuvres in both directions between the hangar and the take-off and landing area 2. If rails 7 or 7' are curved, in order to benefit most from the surface available in the hangar for example, the displacements will be effected in the same manner, but the roller 21 of the guide bars 19 and 20 will be engaged in a rail other than rails 7 and 7', so that the curves of these rails 7 and 7' are passed without the helicopter 5 ceasing to be above carriage 12.

FIGS. 14 to 17 schematically show another embodiment of the manoeuvring device according to the invention and the operation thereof.

This second embodiment of manoeuvring device is compatible with a landing aid device of the type comprising a landing cable, a probe and nippers, as described hereinabove. The manoeuvring device comprises, in this case, a guide and drive carriage, displaced along a rail by a cable and a winch of the type described for example in U.S. Pat. No. 3,640,490 mentioned above.

With this guide rail and with this carriage which cooperates with the probe of the helicopter, and with which a ship may already be equipped, there are associated two guide bars 19 and 20 which are fixed, as before, by the fork joint 22 to the axle of that (or those) of the wheels of the landing gear of the helicopter which swivels, and of which the engaging roller 21 is engaged in the rail.

Figure 14:
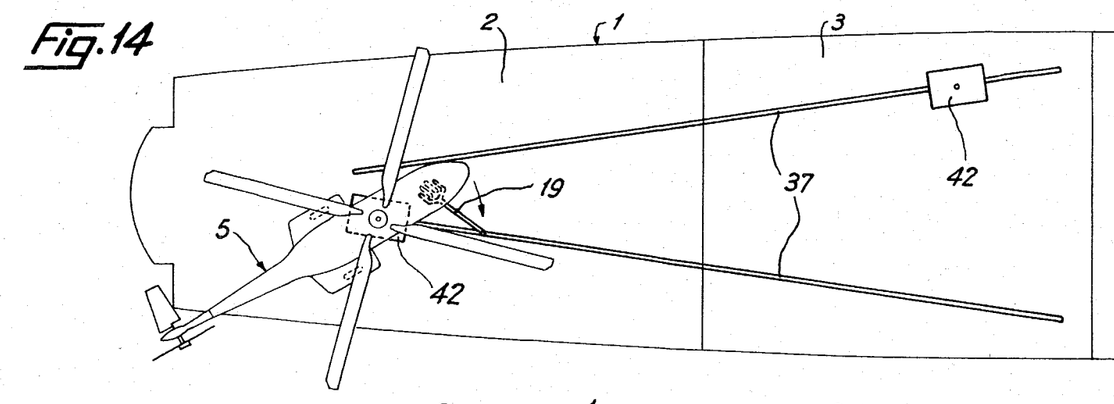
FIG. 14 is a view similar to FIG. 1 of the rear deck of a ship equipped with a landing aid device of the type comprising a probe, nippers and a landing cable, and as described in the U.S. Patent mentioned above, of a device according to the invention, and on which a helicopter has just landed.
Figure 15:
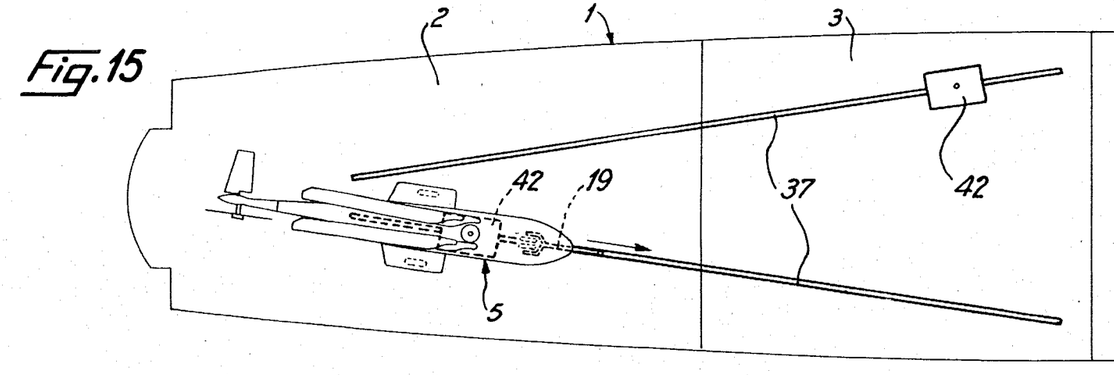
FIG. 15 is a view similar to FIG. 14 which shows the helicopter at the beginning of its displacement towards the hangar.

FIGS. 14 and 15 show a rear deck 1 of a ship and a helicopter 5, identical to those shown in FIGS. 1 and 2. Elements identical to the elements shown in FIGS. 1 to 13 are given the same references.

The rails 37 and the guide and drive carriages 42 as well as their drive means, are those of a manoeuvring device already existing on the ship, and of which the components are used in the manoeuvring device according to the invention.

Figure 16:
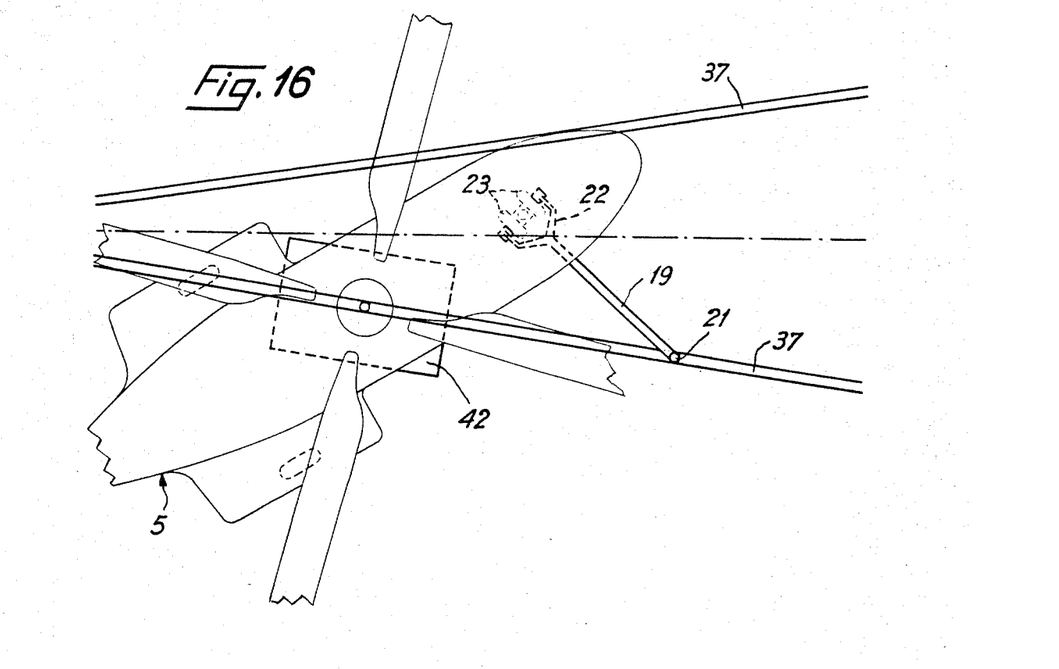
FIG. 16 is a partial plan view showing the helicopter after having landed and after the guide bar has been positioned.
Figure 17:
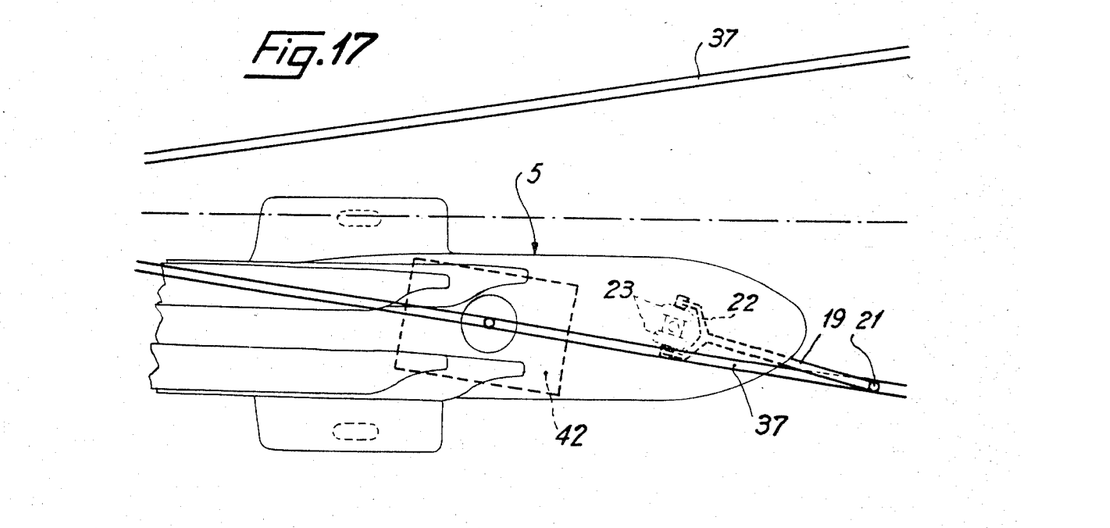
FIG. 17 is a view similar to FIG. 16 showing the helicopter at the beginning of displacement towards the hangar.

In FIG. 14, after landing, the helicopter is held against the deck 1 by its probe which is clamped in the nippers, and then by its link with carriage 42. Then, as shown in FIGS. 14 and 16, the guide bar 19 is positioned in the same manner as described in the preceding embodiment. The blades of the helicopter 5 are then folded, for example all rearwardly, as soon as the rotors stop, and the drive means of the carriage 42 are operated, and, as soon as it begins to taxi, as shown in FIG. 17, the helicopter 5 recentres and aligns progressively and automatically on the axis of the rail 37 chosen due to the presence and to the position of the bar 19 with respect to the carriage 42. Very rapidly, the helicopter is aligned as shown in FIG. 15, whilst being displaced towards the hangar.

The displacement in opposite direction, from the hangar towards the take-off area 2, is effected as in the first example, by substituting the small guide bar 20 for the large one 19, by engaging its roller 21 in the rail 37 between the front wheels 23 of the front landing gear and the carriage 42.

It is thus noted that, in both embodiments, the combination of a helicopter, a carriage, a rail and a guide bar at least effects a self-centring, in the course of manoeuvring, so that the latter is more rapid and it is no longer necessary to mount a special device for alignment and for locking in alignment.

By simply substituting the two guide bars for prior alignment and locking devices, operational safety of existing installations combined with a landing aid device of the type comprising a landing cable, a probe and nippers, is largely improved.

On the other hand, when first fitting a ship with a landing aid device of the grid/mooring gear type, or when a ship is already equipped with such a device, it is advantageous to install a manoeuvring device according to FIGS. 1 to 13, as, in addition to the advantages mentioned above, the carriage is drawn by the helicopter and is therefore not a tractor carriage, as is the case in all similar prior art installations, with the result that this carriage is not subjected to bending forces, and the telescopic rod for connecting the carriage to the helicopter exerts a pulling force on the helicopter, which applies the latter on the deck and increases stability thereof during the manoeuvres.

In addition, the helicopter is automatically oriented at the beginning of taxiing without the tyres of the main landing gears skidding.

Finally, in this case, it is not necessary for the ship to take an "aviation heading".

Although the two embodiments of the manoeuvring device according to the invention have been described hereinabove in their use for a helicopter equipped with a landing gear incorporating an auxiliary front landing gear having swivelling wheels, these two devices may also be used on helicopters equipped with a swivelling tail wheel.

What is claimed is:

1. A safety system for maneuvering an aircraft having a wheeled undercarriage with at least one swivelling wheel, such as a helicopter, between a landing and take-off area defined on a flight deck of a ship and at least one contiguous garage area, said flight deck being equipped with one landing aid device comprising releasable linking means chosen in the group including landing cables, probes and mooring gears for releasably linking said flight deck to a lower part of the fuselage of said aircraft and for maintaining said aircraft in place on said landing and take-off area prior to a take-off or after a landing of said aircraft without any risk of rolling, skidding and upsetting of said aircraft under the influence of the movements of said deck and of the wind, wherein said safety system includes in combination:

at least one rectilinear guide rail installed on said flight deck and extending from said landing and take-off area to one of said garage area for exerting, with respect to said flight deck, a longitudinal and lateral guiding action and a vertical retaining action on main carriage means provided for guiding and maintaining said aircraft on said flight deck, said main carriage means being engaged in one of said rails for moving along it and being provided with connecting means for being connected to a lower point of fixation beneath said aircraft fuselage, said connecting means developing and permanently exerting a downward vertical effort retaining said aircraft urged against said deck and providing for the stability of said aircraft against skidding and upsetting during maneuvering of said aircraft from one to the other of said two areas between which said one guide rail extends, and after said linking means has been released, a towing mechanism comprising, for each said rail, two winches disposed in the axis of the corresponding rail on either side of the path of said aircraft between the corresponding two said areas, and two cables each wound on one of said two winches so that one of said cables is for being hooked to a front point of fixation on said aircraft to displace the latter from said landing and take-off area to the corresponding garage area when the corresponding winch operates as a towing winch, whilst the second cable is for being hooked to a rear point of fixation on said aircraft to displace the latter in opposite direction when the corresponding winch operates as a towing winch, and a guiding device for guiding, said at least one swivelling wheel of said aircraft undercarriage, said guiding device comprising at least one guide bar having two ends one of which is for being connected to said at least one swivelling wheel whilst the other end is for being connected to auxiliary carriage means engaged, restrained and moving in said rail in which said main carriage means is engaged, so that, when one of said two winches operates as a towing winch, said main and auxiliary carriage means, said guiding bar and said rail produce combined effects which automatically and progressively recenter and align said aircraft on said rail, at the beginning of the displacement of said aircraft from one to the other of said corresponding two areas, and after releasing of said linking means of said landing aid device when said aircraft moves towards the corresponding garage area.

2. The system of claim 1, wherein said auxiliary carriage means is disposed in said rail eitther between the point of connection of said one end of said guide bar with said swivelling wheel and said main carriage means, or to the outside of the segment defined by said point of connection and said main carriage means, in the direction of displacement of said aircraft, when the latter is displaced in one direction or the other from one to the other of said two corresponding areas.

3. The system of claim 2, wherein it comprises two guide bars of unequal length, of which the shorter is used with said other end connected to said auxiliary carriage means disposed in said rail between said point of connection of said one end with said swivelling wheel and said main carriage means.

4. The system of claim 1 wherein said connecting means of said main carriage means comprises a telescopic connecting rod having two ends by one of which it is mounted to pivot on said main carriage means and the other of which is for being mounted to pivot on a fitting fast with said aircraft at said lower point of fixation.

5. The system of claim 1, wherein said main carriage means bears a jack and a pulley and wherein said connecting means comprises a cable attached to a moving end of said jack, passing over said guide pulley and hookable on said aircraft at said lower point of fixation.

6. The system of claim 1 wherein said two cables of said towing mechanism are hooked to said aircraft and are constantly tensioned whilst one of said two winches operates as a towing winch whereas the other winch operates as a retaining winch.

7. The system of claim 1, for maneuvering said aircraft on said flight deck equipped with a landing aid device of the type comprising as linking means a grid mounted in said landing and take-off area and a mooring gear mounted beneath the aircraft for being hooked in said grid, wherein said system further comprises a connecting rail for bringing said main carriage means sufficiently close to said aircraft for said connecting means to be attached to said aircraft when said mooring gear of the latter is hooked on said grid in a zone remote from said rail in which said main carriage means is engaged.

8. A device for maneuvering a machine supported by at least one swivelling wheel, such as a helicopter, between two predetermined zones on a flat platform, such as a landing and take-off area and a garage area on the deck of a ship, and which comprises a towing mechanism, adapted to drive the machine from one zone to the other, at least one guide rail installed on the platform and extending from one zone to the other, at least one guiding carriage movable along said guide rail and provided with a member for connection to the machine, and at least one guide bar adapted to be connected by one end to the swivelling wheel and to be engaged and guided by the other end in said guide rail, so that the machine is automatically and progressively recentered and aligned on the rail at the beginning of the displacement from one zone towards the other, due to the combined effects of the carriage and of the guide bar, said guide bar engaging said rail between the point of fixation of the member connecting the carriage to the machine and the point of connection of the other end of the guide bar to the swivelling wheel of the machine.

* * * * *